United States Patent [19]

Masuda et al.

[11] Patent Number: 5,287,941
[45] Date of Patent: Feb. 22, 1994

[54] DRIVE WHEEL TORQUE CONTROLLING SYSTEM FOR VEHICLE

[75] Inventors: Katsuhiko Masuda; Jun Aoki; Yasuji Shibahata, all of Wako, Japan

[73] Assignee: Honda Giken Kogyo Kabushiki Kaisha, Tokyo, Japan

[21] Appl. No.: 914,106

[22] Filed: Jul. 16, 1992

[30] Foreign Application Priority Data

Jul. 18, 1991 [JP] Japan .................... 3-178507

[51] Int. Cl.[5] ............................. B60K 23/04
[52] U.S. Cl. .................... 180/197; 364/426.03; 180/248
[58] Field of Search ................. 180/197, 248; 364/426.03

[56] References Cited

U.S. PATENT DOCUMENTS

| | | | |
|---|---|---|---|
| 5,024,285 | 6/1991 | Fujita | 180/197 |
| 5,038,288 | 8/1991 | Moride et al. | 180/197 X |
| 5,168,953 | 12/1992 | Naito | 180/197 |
| 5,181,175 | 1/1993 | Shiraishi et al. | 180/197 X |

FOREIGN PATENT DOCUMENTS

| | | |
|---|---|---|
| 0339014 | 10/1989 | European Pat. Off. . |
| 0415654 | 3/1991 | European Pat. Off. . |
| 3832768 | 4/1989 | Fed. Rep. of Germany . |
| 1-145241 | 6/1989 | Japan . |

OTHER PUBLICATIONS

Patent Abstracts of Japan, Sep. 6, 1989, No. 1-145240, Kenichi Ogawa.

Primary Examiner—Margaret A. Focarino
Assistant Examiner—C. Mattix
Attorney, Agent, or Firm—Armstrong, Westerman, Hattori, McLeland & Naughton

[57] ABSTRACT

A drive wheel torque control system for a vehicle includes control means for controlling a variable differential motion limiting device provided between drive wheels to distribute a predetermined LSD torque from a racing drive wheel to a nonracing drive wheel. The control means includes vehicle speed determining means for determining a vehicle speed from a follower wheel spaced, drive wheel speed determining means adapted to select a smaller one of the drive wheel speeds as a drive wheel speed, when the inner-side wheel in turning movement is racing, and to select a larger one of the drive wheel speeds, when the outer-side wheel in turning movement is racing, and torque determining means for determining the LSD torque from the vehicle speed and the drive wheel speed. This ensures that only when the inner wheel is racing, the smaller one of the drive wheel speeds can be selected, and an LSD torque can be distributed to the outer wheel, thereby easily effecting the adjustment of the locus of turning movement of the vehicle when the inner wheel is racing, while properly controlling the behavior of the vehicle.

14 Claims, 6 Drawing Sheets

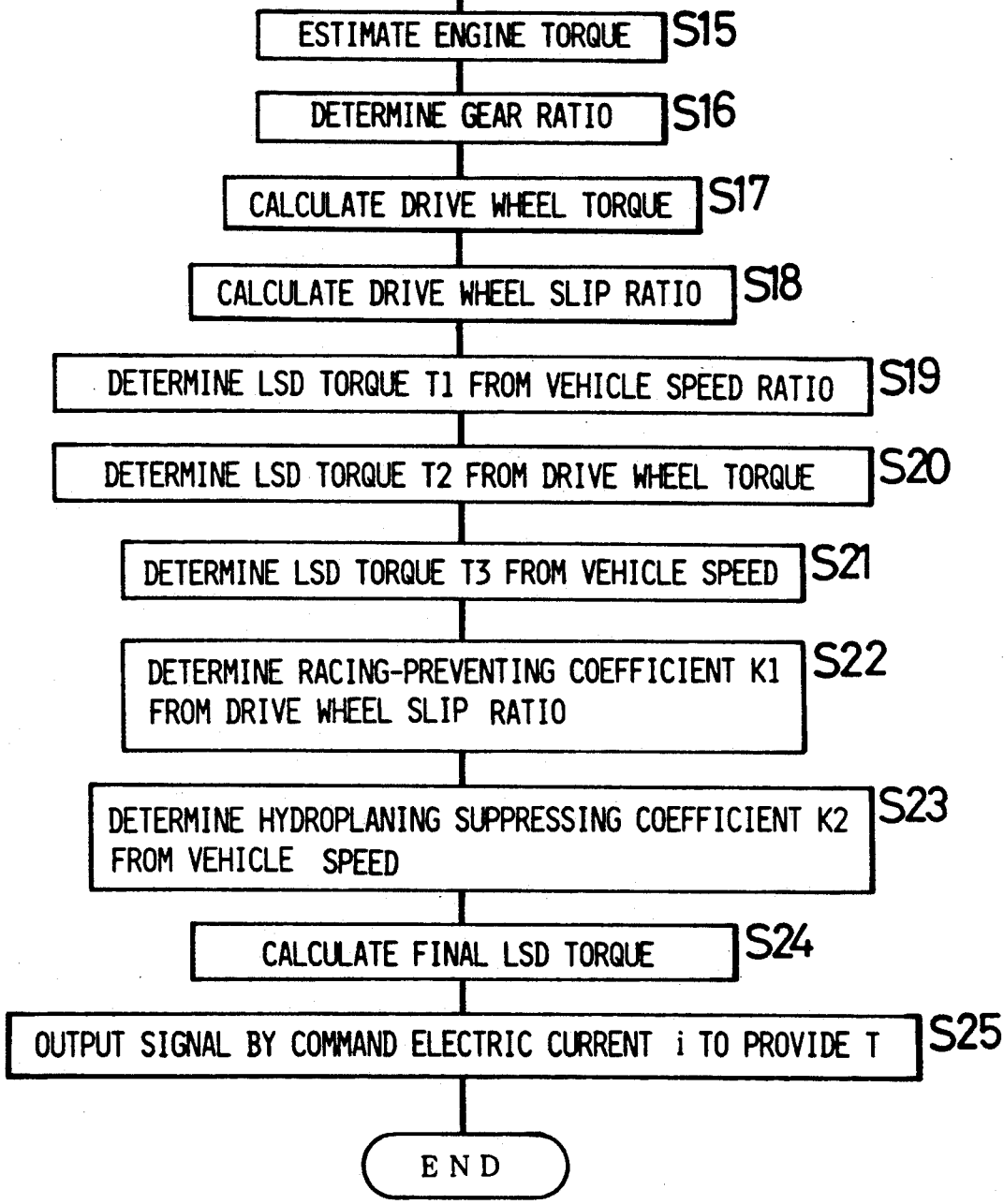

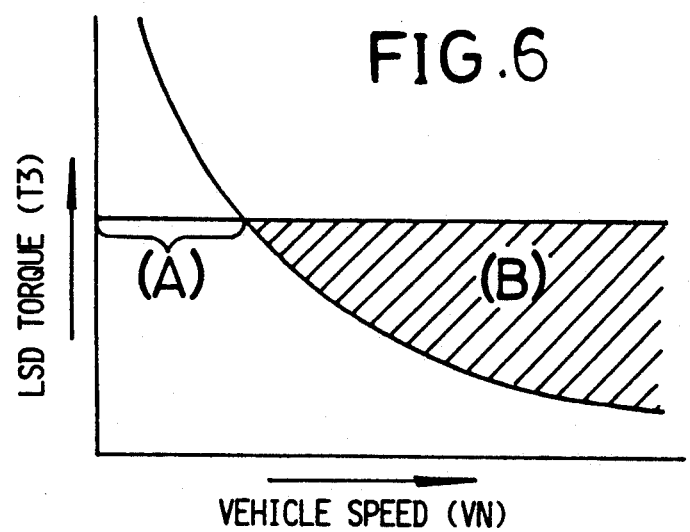
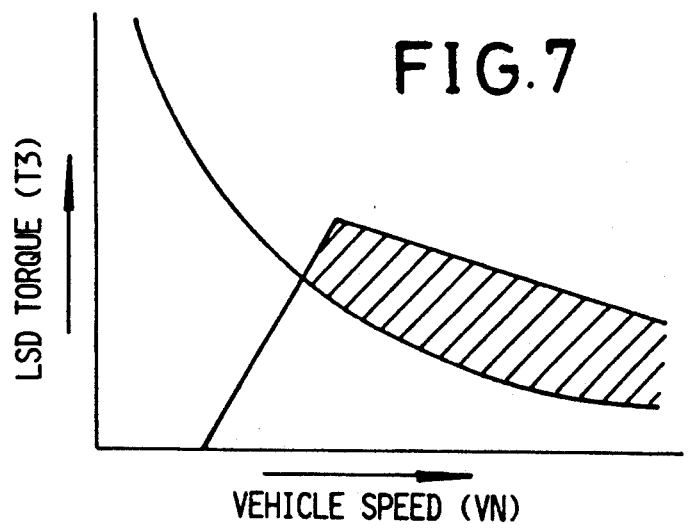
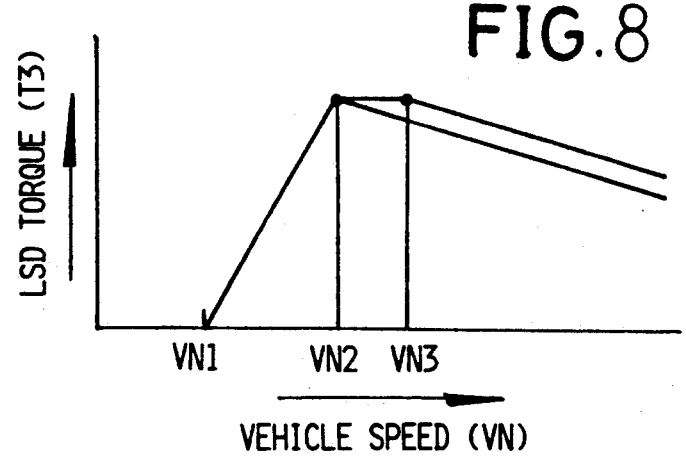

DRIVE WHEEL TORQUE CONTROLLING SYSTEM FOR VEHICLE

BACKGROUND OF THE INVENTION

1. FIELD OF THE INVENTION

The present invention relates to a drive wheel torque controlling system for a vehicle, comprising controlling means for controlling a variable differential motion limiting device provided between both drive wheels to distribute a predetermined LSD torque from a racing or spinning drive wheel to a non-racing or non-spinning drive wheel.

2. DESCRIPTION OF THE RELATED ART

During travelling of a vehicle on a so-called "split μ" road with different friction coefficients on left and right road surfaces, when a drive wheel on the road surface having a lower μ slips, the differential motion of the drive wheels is limited by a differential motion limiting device to distribute a "limited slip differential" torque (which will be referred to as "LSD torque" hereinafter) from the drive wheel on the lower μ road surface to the drive wheel on the higher μ road surface to transmit the driving force of the drive wheel on the higher μ road surface to the road surface, thereby enhancing the running performance on the split μ road.

There are conventionally known drive wheel torque controlling systems in a vehicle equipped with such differential motion limiting device, wherein the compatibility between the suppression of racing or spinning of drive wheels and the running property on a split μ road is provided by reducing the output from an engine when the slip ratio of the drive wheel exceeds a predetermined value (see Japanese Patent Application Laid-open No. 145241/89). In the system described in the above publication, when calculating the slip ratio of the drive wheels, a smaller one of wheel speeds of the left and right drive wheels is selected as a drive wheel speed.

In a vehicle in which a variable differential motion limiting device for distributing the LSD torque from the racing drive wheel to the non-racing drive wheel is electronically controlled, if the amount of LSD torque distributed is calculated on the basis of the smaller one of the left and right drive wheel speeds in the above manner, when an outer-side drive wheel rides on a low μ road, for example, during turning movement of the vehicle, the LSD torque may be excessively distributed to an inner-side drive wheel, promoting vehicle instability. In addition, when one of the drive wheels rides on the low μ road to race, for example, in a higher speed region, the LSD torque may be excessively distributed to the other drive wheel, increasing the difficulty in satisfactorily controlling the behavior of the vehicle.

SUMMARY OF THE INVENTION

Accordingly, it is an object of the present invention to provide a drive wheel torque control system for a vehicle, wherein an appropriate LSD torque can be always generated in a wide vehicle speed region.

To achieve the above object, according to a first feature of the present invention, there is provided a drive wheel torque control system for a vehicle, comprising control means for controlling a variable differential motion limiting device provided between drive wheels to distribute a predetermined LSD torque from a racing drive wheel of the wheels to a non-racing drive wheel of the wheels, the control means comprising vehicle speed determining means for determining a vehicle speed from wheel speeds of follower wheels, drive wheel speed determining means for selecting a smaller one of the wheel speeds of the drive wheels as a drive wheel speed, when in turning movement an inner-side wheel is racing, and to select a larger one of the wheel speeds of the drive wheels, when in turning movement an outer-side wheel is racing, and torque determining means for determining the LSD torque from the vehicle speed and the drive wheel speed.

With the above construction, only when the inner-side wheel is racing, the smaller wheel speed of the drive wheels is selected as a drive wheel speed, and the LSD torque is distributed to the outer-side wheel. Therefore, it is possible to easily adjust the locus of turning movement in the racing of the inner-side wheel, while properly controlling the behavior of the vehicle.

In addition, according to a second feature of the present invention, there is provided a drive wheel torque control system for a vehicle, wherein in addition to the construction in the first feature, the drive wheel speed determining means selects the smaller one of the wheel speeds of the drive wheels as the drive wheel speed, when the vehicle speed is low, and selects a larger one of the wheel speeds of the drive wheels as the drive wheel speed, when the vehicle speed is high.

With the above construction, it is possible to prevent an excessive racing of the drive wheel during starting acceleration of the vehicle or in a lower speed region, thereby enhancing the starting and acceleration performances. In addition, when one of the drive wheels rides and races on a low μ road in the higher speed region, it is possible to control the behavior of the vehicle satisfactorily by preventing the LSD torque from being excessively distributed to the other drive wheel.

According to a third feature of the present invention, there is provided a drive wheel torque control system for a vehicle, wherein in addition to the construction in the second feature, the drive wheel speed determining means selects a smaller one of the wheel speeds of the left and right drive wheels, when the vehicle speed is in the mean speed range and the inner-side wheel is racing during a turn, and to select a larger one of the wheel speeds of the drive wheels, when the vehicle speed is in the mean speed range and the outer-side wheel is racing during a turn.

With the above construction, it is possible to prevent an excessive racing of the drive wheel during starting acceleration of the vehicle or in a lower speed region, thereby enhancing the starting and acceleration performances. In addition, when one of the drive wheels rides on a low μ road and races in the higher speed region, it is possible to control the behavior of the vehicle satisfactorily by preventing the LSD torque from being excessively distributed to the other drive wheel. Moreover, it is possible in the mean speed region to easily adjust the locus of turning movement during the racing of the inner-side wheel, while properly controlling the behavior of the vehicle.

According to a fourth feature of the present invention, there is provided a drive wheel torque control system for a vehicle, wherein in addition to the construction in the first feature, the torque determining means includes wheel speed ratio proportional control means for finding a direction of turning movement of the vehicle from a difference between the follower wheel speeds, for judging, on the basis of the turning direction, which of the inner-side and outer-side drive wheels is racing, for comparing the ratio of the wheel speeds of the drive wheels with the ratio of the wheel speeds of the follower wheels in each of a case where the inner driving wheel is racing and a case where the outer driving wheel is racing, and for determining an LSD torque to be distributed from the racing drive wheel to the non-racing drive wheel in accordance with an amount of the ratio of the wheel speeds of the drive wheels exceeding the ratio of the wheel speeds of the follower wheels.

With the above construction, when the ratio of the left and right drive wheel speeds is large, a large LSD torque can be applied to insure a starting performance on a split $\mu$ road, as in a mechanical differential motion limiting device of a conventional rotation-number difference sensitive type or preset torque type showing a strong torque characteristic. Moreover, it is possible to avoid the occurrence of a tight turn braking which becomes a problem in the mechanism of the differential motion limiting device, while preventing the generation of an LSD torque at the initial stage of turning movement or during travelling of the vehicle at a low speed, and avoiding a tendency to under-steer.

According to a fifth feature of the present invention, there is provided a drive wheel torque control system for a vehicle, wherein in addition to the construction in the first feature, the torque determining means includes engine torque proportional control means for providing an LSD torque corresponding to an estimated engine torque.

With the above construction, it is possible to compensate for a delay of responsiveness which may be produced when the wheel speed ratio proportional control means is used.

According to a sixth feature of the present invention, there is provided a drive wheel torque control system for a vehicle, wherein in addition to the construction in the first feature, the torque determining means includes vehicle speed proportional control means for providing an LSD torque corresponding to a vehicle speed.

With the above construction, it is possible to provide an improved feeling of stability during straight-line travelling of the vehicle at a high speed.

According to a seventh feature of the present invention, there is provided a drive wheel torque control system for a vehicle, wherein in addition to the construction in the first feature, the vehicle speed determining means selects a larger one of the wheel speeds of the follower wheels as a vehicle speed.

With the above construction, it is possible to decrease an error between an actual vehicle speed and a follower wheel speed at the time when one of the follower wheels rides and races on a low $\mu$ road.

According to an eighth feature of the present invention, there is provided a drive wheel torque control system for a vehicle, wherein in addition to the construction in the sixth feature, the vehicle speed proportional control means increases the LSD torque, when the vehicle speed exceeds a first predetermined value, and to decrease the LSD torque, when the vehicle speed exceeds a second predetermined value larger than the first predetermined value.

With the above construction, it is possible to maintain the LSD torque at a small level when the vehicle speed is in a lower speed region equal to or less than the first predetermined value, thereby facilitating the garaging of the vehicle, or the like, and to apply the LSD torque in an amount required for obtaining an effect of stability in a higher speed region equal to or more than the second predetermined value, thereby suppressing a loss of energy.

According to a ninth feature of the present invention, there is provided a drive wheel torque control system for a vehicle, wherein in addition to the construction in the fourth feature, the wheel speed ratio proportional control means decreases the LSD torque in response to an increase in a slip ratio of the drive wheels.

With the above construction, excessive slippage of the drive wheel is inhibited, because the LSD torque is decreased in response to an increase in slip ratio of the drive wheels.

According to a tenth feature of the present invention, there is provided a drive wheel torque control system for a vehicle, wherein in addition to the construction in the fourth feature, the LSD torque determined by the wheel speed ratio proportional control means is decreased in response to an increase in the vehicle speed.

With the above construction, hydroplaning is inhibited, because the LSD torque is decreased in response to an increase in vehicle speed.

According to an eleventh feature of the present invention, there is provided a drive wheel torque control system for a vehicle, wherein in addition to the construction in the fifth feature, the engine torque proportional control means decreases the LSD torque in response to an increase in the engine torque.

With the above construction, it is possible to effectively suppress a delay of responsiveness.

The above and other objects, features and advantages of the invention will become apparent from the following description of the preferred embodiments, taken in conjunction with the accompanying drawings.

BRIEF DESCRIPTION OF THE DRAWINGS

FIGS. 1 to 8 illustrate a preferred embodiment of the present invention, wherein:

FIG. 1 is an illustration of the entire arrangement of a drive wheel torque control system in a vehicle;

FIG. 2 is a block diagram of a first division of the drive wheel torque control system;

FIG. 3 is a block diagram of a second division of the drive wheel torque control system;

FIG. 4 is a first portion of a flow chart;

FIG. 5 is a second portion of the flow chart; and

FIGS. 6 to 8 are graphs illustrating a relationship between the vehicle speed VN and the LSD torque $T_3$.

DESCRIPTION OF THE PREFERRED EMBODIMENTS

Figure 1:
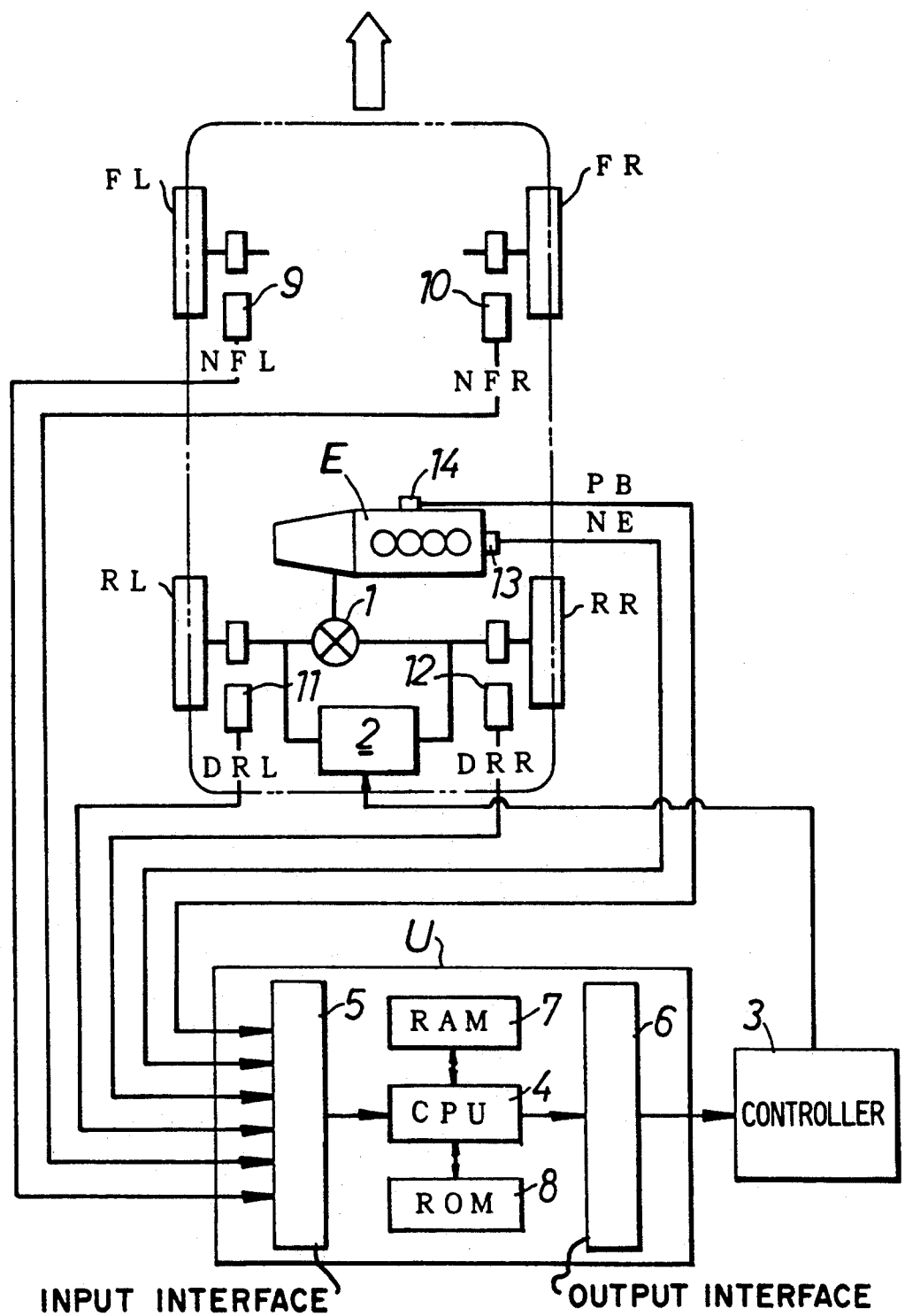

Referring to FIG. 1, a rear engine and rear drive vehicle comprises a left front wheel FL and right front wheel FR as follower wheels, and a left rear wheel RL and a right rear wheel RR as drive wheels. The left and right rear wheels RL and RR are connected to an Engine E through a differential 1 which is provided with a variable differential motion limiting device 2, also called a limited slip differential. The variable differential motion limiting device 2 functions to control the connection between drive shafts of the left and right rear wheels RL and RR by a hydraulic clutch or the like driven through a controller 3 and to distribute a torque from the racing rear wheel to the non-racing rear wheel.

An electronic control unit U is comprised of a microcomputer which comprises a CPU 4, an input interface 5, an output interface 6, an RAM 7 and an ROM 8. An output signal NFL from a left front wheel rotational-speed sensor 9 for detecting the rotational speed of the left front wheel FL, an output signal NFR from a right front wheel rotational-speed sensor 10 for detecting the rotational speed of the right front wheel FR, an output signal DRL from a left rear wheel rotational-speed sensor 11 for detecting the rotational speed of the left rear wheel RL and an output signal DRR from a right rear wheel rotational-speed sensor 12 for detecting the rotational speed of the right rear wheel RR are received into the input interface 5. An output signal NE from an engine revolution-number sensor 13 for detecting the number of revolutions of the engine E and an output signal PB from an engine intake negative pressure sensor 14 for detecting the negative pressure within an intake pipe of the engine E are also received into the input interface 5. These six output signals NFL, NFR, DRL, DRR, NE and PB are variable in calculations performed in the CPU 4, and the results of such calculations are supplied to the controller 3 via the output interface 6.

The control of the variable differential motion limiting device 2, according to the embodiment of the present invention, comprises a combination of the following three controls (1), (2) and (3).

(1) Proportional Control Wheel Speed Ratio

The direction of turning movement of the vehicle is found from a difference between the left front wheel speed NFL and the right front wheel speed NFR, and it is judged which of inner-side and outer-side wheels, i.e., the left and right rear wheels, RL and RR, is racing. In each case, the ratio of the speeds of the left and right rear wheels RL and RR as the drive wheels is compared with the ratio of the speeds of the left and right front wheels FL and FR as the follower wheels, and an LSD torque to be distributed from the racing rear wheel to the non-racing rear wheel in accordance with an excess of the ratio of the speeds of the rear wheels RL and RR over the ratio of the speeds of the front wheels FL and FR is found, thereby controlling the variable differential motion limiting device 2.

(2) Proportional Control of Engine Torque

In the above-described proportional control of the wheel speed ratio, the LSD torque is generated after the generation of a variation in wheel speed, and therefore, in some cases, the action of the LSD torque may be delayed relative to the behavior of the vehicle. Thereupon, in order to compensate for such delay, the variable differential motion limiting device 2 is controlled in a manner to provide an LSD torque corresponding to an estimated engine torque.

(3) Proportional Control of Vehicle Speed

In a case which does not correspond to any of the above-described proportional controls of the wheel speed ratio and the engine torque, i.e., in order to improve the feeling of stability during straight travelling of the vehicle at a high speed, the variable differential motion limiting device 2 is controlled in a manner to provide an LSD torque corresponding to a vehicle speed.

An LSD torque T distributed from the racing rear wheel through the variable differential motion limiting device 2 to the non-racing rear wheel is determined according to the following expression:

$$T = T_1 \times K_1 \times K_2 + T_2 + T_3$$

wherein $T_1$ is an LSD torque for the proportional control of the wheel speed ratio; $T_2$ is an LSD torque for the proportional control of the engine torque; and $T_3$ is an LSD torque for the proportional control of the vehicle speed.

In the above expression, $K_1$ in a first term at a right side is a correcting coefficient for preventing the racing of both the left and right wheels on a road surface of a low $\mu$ (a racing preventing coefficient), and $K_2$ is a correcting coefficient for preventing the application of a strong LSD torque when a hydroplaning phenomenon is developed (a hydroplaning suppressing coefficient).

Figure 2:
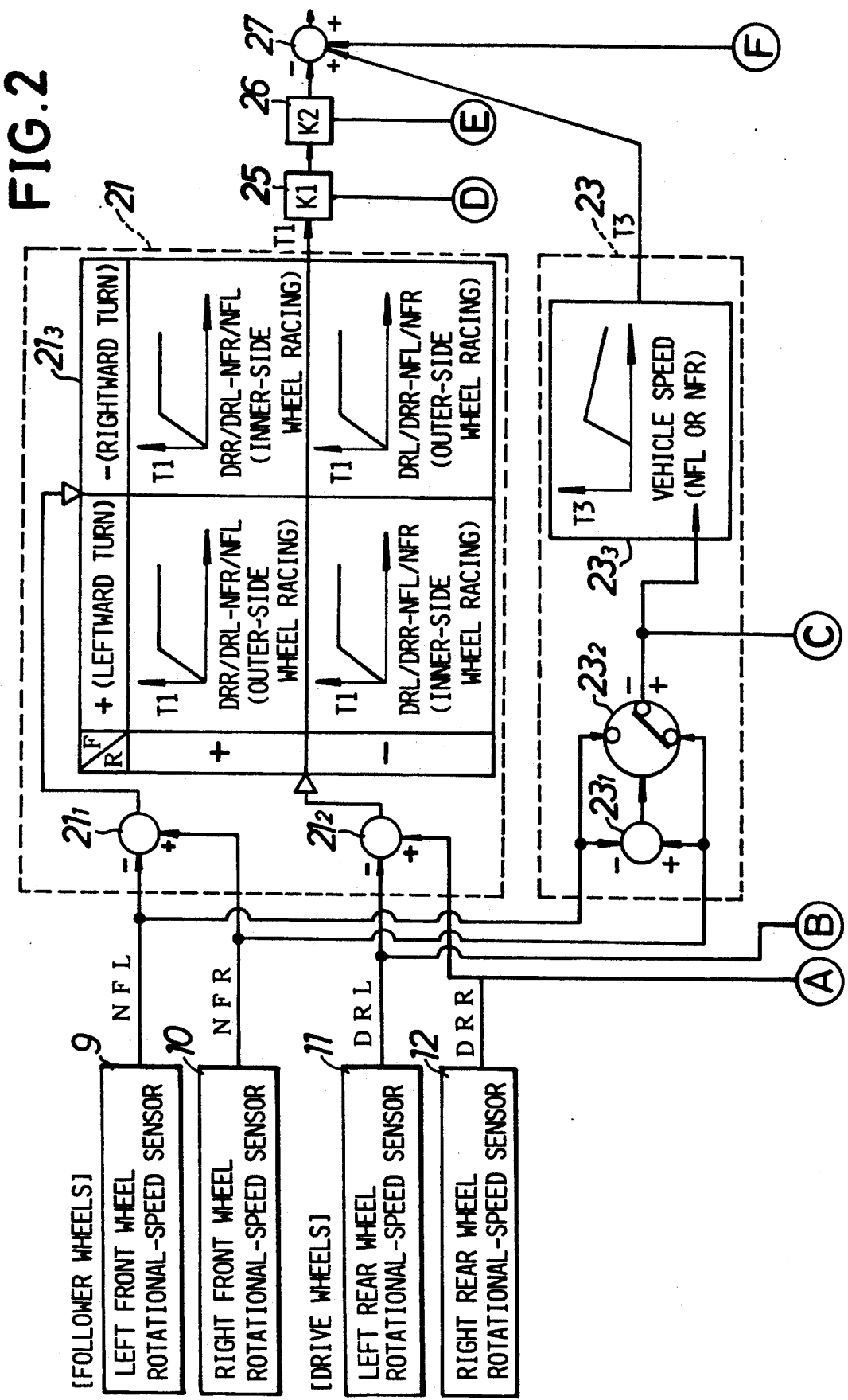
Figure 3:
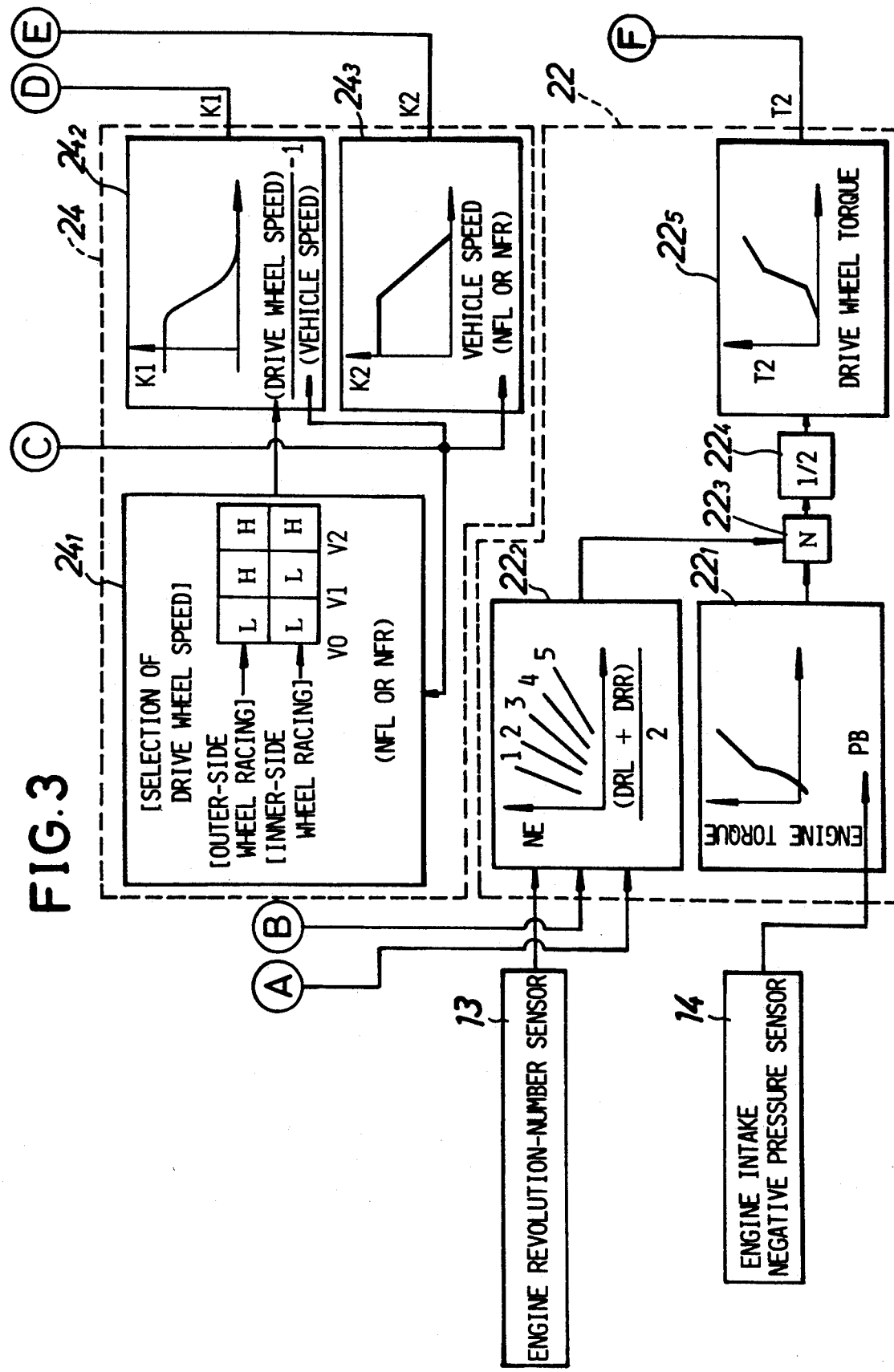

Referring to FIGS. 2 and 3, the left front wheel speed NFL detected by the left front wheel rotational-speed sensor 9 and the right front wheel speed NFR detected by the right front wheel rotational-speed sensor 10, i.e., the speeds of the left and right follower wheels are compared with each other in comparator means $21_1$ of $T_1$ calculating means 21, whereby it is judged whether the vehicle is being turned leftwardly or rightwardly. On the other hand, the left rear wheel speed DRL detected by the left rear wheel rotational-speed sensor 11 and the right rear wheel speed DRR detected by the right rear wheel rotational speed detector 12, i.e., the speeds of the left and right drive wheels are compared with each other in comparator means $21_2$ of the $t_1$ calculating means 21, whereby it is judged which of the outer-side and inner-side wheels in turning movement is racing. If the following four cases:

(1) when the vehicle is being turned leftwardly and the outerside wheel is racing, the vehicle speed ratio : DRR/DRL -NFR/NFL, (2) when the vehicle is being turned leftwardly and the innerside wheel is racing, the vehicle speed ratio : DRL/DRR -NFL/NFR, (3) when the vehicle is being turned rightwardly and the innerside wheel is racing, the vehicle speed ratio : DRR/DRL -NFR/NFL and and (4) when the vehicle is being turned rightwardly and the outerside wheel is racing, the vehicle speed ratio : DRL/DRR -NFL/NFR, are distinguished by a combination of positive and negative signs of output signals from the respective comparator means $21_1$ and $21_2$, and LSD torque T, for the proportional control of the wheel speed ratio is searched in each case on the basis of a map $21_3$ previously stored in the ROM 8 in correspondence to the abovedescribed vehicle speed ratio. The value of the LSD torque $T_1$ is set such that it is increased in proportion to an increase in vehicle speed ratio while the vehicle speed ratio is small, and when the vehicle speed ratio has reached a predetermined value, a given value is maintained.

An engine intake negative pressure PB detected by the engine intake negative pressure sensor 14 is received into $T_2$ calculating means 22, and an engine torque is searched on the basis of a map $22_1$ previously stored in the ROM 8 in correspondence to such engine intake negative pressure PB. The left rear wheel speed DRL detected by the left rear wheel rotational-speed sensor 11, the right rear wheel speed DRR detected by the right rear wheel rotational-speed sensor 12 and the number NE of revolutions of engine (which will be referred to as an engine revolution-number NE hereinafter) detected by the engine revolution-number sensor 13 are received into the $T_2$ calculating means 22, and a gear ratio N is searched from a relationship between (DRL+DRR)/2 which is an average value between both the rear wheel speeds DRL and DRR, and the engine revolution-number NE is searched on the basis of a map previously stored in the ROM 8 Then, the engine torque searched in the map $22_1$ and the gear ratio searched in the map $22_2$ are multiplied together and further multiplied by ¼ in a multiplier $22_4$, thereby calculating a drive wheel torque. When the drive wheel torque is determined in the above manner, an LSD torque $T_2$ for the proportional control of the engine torque is searched on the basis of a map $22_5$ previously stored in the ROM 8. The value of the LSD torque $T_2$ is set such that it is increased in a folded line in accordance with an increase in engine torque, i.e., drive wheel torque.

The left front wheel speed NFL detected by the left front wheel rotational-speed sensor 9 and the right front wheel speed NFR detected by the right front wheel rotational-speed sensor 10 are received into comparing means $23_1$ of $T_3$ calculating means 23, and larger one of the left and right front wheel speeds NFL and NFR is selected as a vehicle speed VN in selecting means $23_2$ connected to the comparing means $23_1$. More specifically, if a brake is operated when one of the front wheels is riding on a road of a low μ, the front wheel riding on the low μ road slips, and the dropping of the speed of the front wheel which is slipping is large, as compared with the speed of the other front wheel which is not slipping. For this reason, when the average value between the left and right front wheel speeds NFL and NFR is selected as a vehicle speed VN, a large deviation may be produced between this vehicle speed VN and an actual vehicle speed VN in some cases. However, if larger one of the left and right front wheel speeds NFL and NFR is selected as a vehicle speed VN, it is possible to prevent the drop of the vehicle speed VN.

An LSD torque $T_3$ for the proportional control of the vehicle speed is searched on the basis of such vehicle speed VN and a map $23_3$ previously stored in the ROM 8. The LSD torque $T_3$ is set such that it is initially slightly increased when the vehicle speed VN exceeds a predetermined value, and the LSD torque $T_3$ is slightly decreased when the vehicle speed VN is further increased. More specifically, the effect of stability of the LSD at a high speed is reduced in response to an increase in vehicle speed VN and therefore, if a given LSD torque $T_3$ is applied, as shown in FIG. 6, this application of the LSD torque is inconvenient at a low speed, such as during garaging of the vehicle (see a portion indicated by A in FIG. 6). In addition, during travelling of the vehicle at a high speed, the more the vehicle speed VN is increased, the less the effect of stability, resulting in a corresponding loss of energy (see a region indicated by B in FIG. 6). Therefore, the LSD torque $T_3$ is set according to the map $23_3$, namely, as shown in FIG. 7 and is applied by an amount required for the effect of stability, thereby suppressing the loss of energy. It is preferable that as shown in FIG. 8, when the vehicle speed VN exceeds $VN_1$ (40 to 60 Km/hr), the LSD torque $T_3$ is started to be increased, and when the vehicle speed VN reaches $VNH_2$ (80 to 90 Km/hr), the LSD torque $T_3$ is gradually decreased, or maintained constant for a period until the vehicle speed VN reaches $VN_3$ (100 Km/hr) and thereafter, the LSD torque $T_3$ is gradually decreased.

It is stored in a map $24_1$ of correcting coefficient calculating means 24 which of the left and right rear wheel speeds DRL and DRR is selected as a drive wheel speed VD, in six cases distinguished depending upon whether the vehicle speed VN (larger one of the NFL and NFR) is in any one of regions: a lower speed region of from $V_O$ (0 Km/hr) to $V_1$ (for example, 15 to 20 Km/hr), a mean speed region of from $V_1$ to $V_2$ (for example, 70 to 80 Km/hr), and a higher speed region of at least $V_2$, and which of the outer-side and inner-side wheel is racing. Specifically, when the outer-side wheel is racing, the lower one of the left and right rear wheel speeds DRL and DRR is selected as a drive wheel speed VD in the lower speed region (low selection L); the higher one is selected as a drive wheel speed VD in the mean speed region (high selection H), and the higher one is selected as a drive wheel speed VD in the higher speed region (high selection H). On the other hand, when the inner-side wheel is racing, the lower one of the left and right rear wheel speeds DRL and DRR is selected as a drive wheel speed VD in the lower speed region (low selection L); the lower one is selected as a drive wheel speed VD in the mean speed region (low selection L), and the higher one is selected as a drive wheel speed VD in the higher speed region (high selection H).

A racing-preventing coefficient $K_1$ relative to a drive wheel slip ratio calculated from the vehicle speed VN and the drive wheel speed VD, i.e., (drive wheel speed VD/vehicle speed VN) −1, is stored in a map $24_2$, and a hydroplaning suppressing coefficient $K_2$ relative to the vehicle speed VN is stored in a map $24_3$. The racing-preventing coefficient $K_1$ is set such that it is decreased from 1 to 0, when the drive wheel slip ratio exceeds a predetermined value, and the hydroplaning suppressing coefficient $K_2$ is also set such that it is decreased from 1 to 0, when the vehicle speed VN exceeds a predetermined value. In multiplying means 25 and 26, the correcting coefficients $K_1$ and $K_2$ are multiplied to the LSD torque determined in the $T_1$ calculating means 21 for the proportional control of the wheel speed ratio.

The LSD torque $T_1$ for the proportional control of the wheel speed ratio after correction, the LSD torque $T_2$ for the proportional control of the engine torque and the LSD torque $T_3$ for the proportional control of the vehicle speed, which have been calculated in the above-described manner, are added in adding means 27, and finally, an LSD torque T to be distributed from the slipping rear wheel via the variable differential motion limiting device 2 to the non-slipping rear wheel is found.

Figure 4:
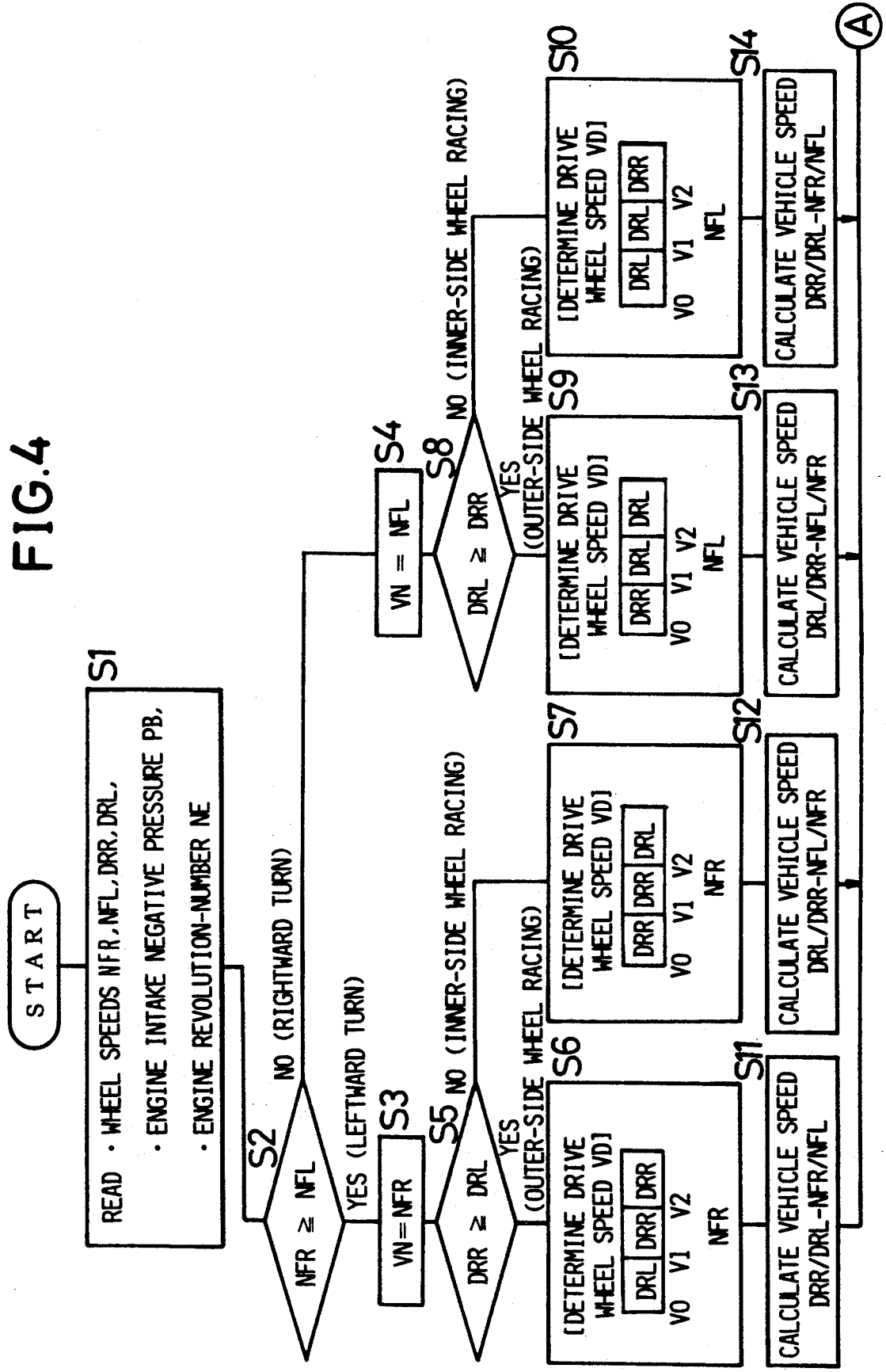

The process for finding the LSD torque will be described below in connection with flow charts shown in FIGS. 4 and 5.

At a step $S_1$, the left front wheel speed NFL, the right front wheel speed NFR, the left rear wheel speed DRL and the right rear wheel speed DRR detected in the left front wheel rotational-speed sensor 9, the right front wheel rotational-speed sensor 10, the left rear wheel rotational-speed sensor 11 and the right rear wheel rotational-speed sensor 12 are read, and the engine revolution-number NE detected in the engine revolution-below number sensor 13 and the engine intake negative-pressure PB detected in the engine intake negative-pressure sensor 14 are read. Then, the left and right front wheel speeds NFL and NFR are compared with each other at a step S2. If the relationship of the right front wheel speed NFR and the left front wheel speed NFL is established, it is decided that the vehicle is being turned leftwardly, advancing to a step S3, where the larger right front wheel speed NFR is selected as a vehicle speed VN. On the other hand, if the relationship of the right front wheel speed NFR the left front wheel speed NFL is not established, it is decided that the vehicle is being turned rightwardly, advancing to a step S4, where the larger left front wheel speed NFL is selected as a vehicle speed VN.

When the vehicle is being turned leftwardly, the left and right rear wheel speeds DRL and DRR, i.e., the left and right drive wheel speeds are compared with each other at a step S5. If the relationship of the right rear wheel speed DRR≧the left rear wheel speed DRL is established, it is decided that the right drive wheel RR which is the outer-side wheel is racing, advancing to a step S6. If the relation of the right rear wheel speed DRR≦the left rear wheel speed DRL is not established, it is decided that the left drive wheel RL which is the inner-side wheel is racing, advancing to a step S7. On the other hand, if the vehicle is being turned rightwardly, the left and right rear wheel speeds DRL and DRR are compared with each other at a step S8. If the relationship of the left rear wheel speed DRL≧the right rear wheel speed DRR is established, it is decided that the left drive wheel RL which is the outer-side wheel is racing, advancing to a step S9. If the relationship of the left rear wheel speed DRL≧the right rear wheel speed DRR is not established, it is decided that the right drive wheel RR which is the inner-side wheel is racing, advancing to a step S10.

At the step S6 in the case where the vehicle is being turned leftwardly and the outer-side wheel is racing, the drive wheel speed VD is selected on the basis of the magnitude of the vehicle speed VN (=the right front wheel speed NFR) selected at the step S3. In other words, when the vehicle speed VN is in the lower speed region of from $V_0$ to $V_1$, the lower left rear wheel speed DRL is selected as a drive wheel speed VD (low selection), and when the vehicle speed VN is in the mean speed region of from $V_1$ to $V_2$, the higher right rear wheel speed DRR is selected as a drive wheel speed VD (high selection). When the vehicle speed VN is in the higher speed region of at least $V_2$, the higher right rear wheel speed DRR is selected as a drive wheel speed VD (high selection). Then, the vehicle speed ratio: DRR/DRL - NFR/NFL is calculated at a subsequent step S11.

At the step S7 in the case where the vehicle is being turned leftwardly and the inner-side wheel is racing, the lower right rear wheel speed DRR is selected as a drive wheel speed VD (low selection), when the vehicle speed VN (=the right front wheel speed NFR) selected at the step S3, and the lower right rear wheel speed DRR is selected as a drive wheel speed VD (low selection), when the vehicle speed VN is in the mean speed region. In addition, the higher left rear wheel speed DRL is selected as a drive wheel speed VD (high selection), when the vehicle speed VN is in the higher speed region. Then, the vehicle seed ratio: DRL/DRR - NFL/NFR is calculated at a subsequent step S12.

At the step S9 in the case where the vehicle is being turned rightwardly and the outer-side wheel is racing, the lower right rear wheel speed DRR is selected as a drive wheel speed VD (low selection), when the vehicle speed VN (=the left front wheel speed NFL) selected at the step S4 is in the lower speed region, and the higher left rear wheel speed DRL is selected as a drive wheel speed VD (high selection), when the vehicle speed VN is in the mean speed region. In addition, the higher left rear wheel speed DRL is selected as a drive wheel speed VD (high selection), when the vehicle speed VN is in the higher speed region. Then, the vehicle speed ratio: DRL/DRR - NFL/NFR is calculated at a subsequent step S13.

At the step S10 in the case where the vehicle is being turned, rightwardly and the inner-side wheel is racing, the lower left rear speed DRL is selected as a drive wheel speed VD (low selection), when the vehicle speed VN (=the left front wheel speed NFL) selected at the step S4 is in the lower speed region, and the lower left rear wheel speed DRL is selected as a drive wheel speed VD (low selection), when the vehicle speed VN is in the mean speed region. In addition, the higher right rear wheel speed DRR is selected as a drive wheel speed VD (high selection), when the vehicle speed VN is in the higher speed region. Then, the vehicle speed ratio: DRR/DRL - NFR/NFL is calculated at a subsequent step S14.

At a step S15, an engine torque is searched in the map (see the map $22_1$) on the basis of the engine intake negative pressure PB read at the step S1. At a subsequent step S16, a gear ratio N is searched in the map (see the map $22_2$) from the engine revolution-number NE and the (DRL+DRR)/2 calculated from the left and right rear wheel speeds DRL and DRR read at the step S1. At a next step S17, a drive wheel torque is calculated on the basis of the engine torque determined at the step S15 and the gear ratio N determined at the step S16.

At a step S18, a drive wheel speed VD and a vehicle speed VN are selected from the map $24_1$ on the basis of the turning direction determined at the step S2 and the racing wheels determined at the steps S5 and S8, and a drive wheel slip ratio is calculated from such drive wheel speed VD and vehicle speed VN.

Then, at a step S19, an LSD torque $T_1$ for the proportional control of the wheel speed ratio is searched in the map (see the map $21_3$) on the basis of any of the following four vehicle speed ratios determined at the steps S11 to S14:

DRR/DRL - NFR/NFL, when the vehicle is being turned leftwardly and the outer-side wheel is racing, DRL/DRR - NFL/NFR, when the vehicle is being turned leftwardly and the inner-side wheel is racing, DRL/DRR - NFL/NFR, when the vehicle is being turned rightwardly and the outer-side wheel is racing, and DRR/DRL - NFR/NFL, when the vehicle is being turned rightwardly and the inner-side wheel is racing.

At a step S20, an LSD torque $T_2$ for the proportional control of the engine torque is searched in the map (see the map $22_2$) on the basis of the drive wheel torque determined at the step S17. At a step S21 an LSD torque $T_3$ for the proportional control of the vehicle speed ratio is searched in the map (see the map $22_3$) on the basis of the vehicle speed VN selected at the step 3 or 4.

Subsequently, at a step S22, a racing-preventing coefficient $K_1$ is searched in the map (see the map $24_2$) on the basis of the drive wheel slip ratio calculated at the step S18. Further, t a step S23, a hydroplaning-suppressing coefficient $K_2$ is searched in the map (see the map $24_3$) on the basis of the vehicle speed VN selected at the step 3 or 4.

If the individual LSD torques $T_1$, $T_2$ and $T_3$ and coefficients $K_1$ and $K_2$ are determined in this manner, a final LSD torque T to be distributed from the racing rear wheel to the non-racing rear wheel is calculated at a step S24. Then, an electric current value i to be delivered to the controller 3 in order to provide the LSD torque T is determined at a step S25. Thus, the variable differential motion limiting device 2 distributes an LSD torque of a magnitude proportional to the electric current value i from the racing rear wheel to the non-racing wheel.

In the above method, if the speed ratio of the left rear wheel speed DRL to the right rear wheel speed DRR is large as a result of the proportional control of the wheel speed ratio, a large LSD torque $T_1$ is applied. Therefore, a starting performance on a split $\mu$ road is insured as in a mechanical differential motion limiting device of a conventional rotational number difference-sensitive type or a preset torque type showing a strong torque characteristic. Moreover, it is possible not only to avoid the occurrence of a tight turn braking which becomes a problem in the conventional mechanical differential motion limiting devices, because no LSD torque $T_1$ is produced during turning movement of the vehicle at a low speed, but also to prevent the tendency of understeering, because no LSD torque $T_1$ is produced at the initial stage of turning movement of the vehicle and during travelling of the vehicle at a low speed.

Since the racing-preventing coefficient $K_1$ for correcting the LSD torque $T_1$ for the proportional control of the wheel speed ratio is corrected according to the vehicle speed VN, the following effects are exhibited: In the lower speed region, the LSD torque $T_1$ is reduced, when the drive wheel speed VD resulting from a low selection from the left and right wheel speeds DRL and DRR exceeds the vehicle speed VN by a given proportion, and therefore, the non-racing rear wheel is prevented from racing in sympathy due to a strong LSD torque $T_1$. In addition, if the low selection is conducted in the above manner, there is a possibility that an LSD torque is excessively generated, resulting in an unstable behavior of the vehicle, when the outer rear wheel rides on a road of low $\mu$ during turning movement of the vehicle in the mean and higher speed regions. According to the preferred embodiment, however, it is possible in the high speed region to stabilize the behavior of the vehicle by using a drive wheel speed VD resulting from a high selection from the left and right rear wheel speeds DRL and DRR. Further, if the high selection is conducted in the above manner, it is difficult to control the locus of turning movement, when the racing of the inner-side wheel occurs. However, the control of the locus of turning movement is facilitated by effecting the low selection, when the inner side wheel is racing in the mean speed region.

If the LSD torque for the proportional control of the wheel speed ratio is applied as it is, the LSD torque is excessive, causing a deflection of the vehicle, when a hydroplaning phenomenon is produced, and in addition, with a front wheel drive vehicle, there is a possibility that a steering wheel may be hard to manipulate, resulting in a sudden change in steering force or the like. However, the above problems are solved by reducing the LSD torque $T_1$ in response to an increase in vehicle speed VN by the hydroplaning-suppressing coefficient $K_2$.

In the proportional control of the wheel speed ratio, the LSD torque $T_1$ is found after actual generation of a change in wheel speed and, for this reason, a prompt responsiveness may not be obtained in some cases. However, a delay of the responsiveness is alleviated by increasing the LSD torque $T_2$ in accordance with an increase in engine torque. Further, it is possible to improve the feeling of stability during straight travelling of the vehicle at a high speed by increasing the LSD torque $T_3$ in accordance with an increase in vehicle speed VN up to a predetermined speed, and it is possible to suppress a loss of energy by gradually reducing the LSD torque $T_3$ after the vehicle speed has exceeded the predetermined speed.

Although the preferred embodiment of the present invention has been described above in detail, it will be understood that the present invention is not limited to the above-described embodiment, and various minor modifications and variations in design can be made without departing from the spirit and scope of the invention defined in claims.

For example, although the rear wheel drive vehicle has been illustrated in the embodiment, the present invention is also applicable to front wheel drive vehicles. In this case, the front wheels are drive wheels and the rear wheels are follower wheels and, hence, the above description may be read with the left front wheel speed NFL being replaced by the left rear wheel speed DRL; the right front wheel speed NFR being by the right rear wheel speed DRR; the left rear wheel speed DRL being by the left front wheel speed NFL; and the right rear wheel speed DRR being by the right front wheel speed NFR. In addition, in place of selection of larger one of the left and right front wheel speeds NFL and NFR as a vehicle speed VN, an average value between the left and right front wheel speeds NFL and NFR may be employed.

What is claimed is:

1. A drive wheel torque control system for a vehicle, comprising control means for controlling a variable differential motion limiting device provided between drive wheels to distribute a predetermined LSD torque from a racing drive wheel of the wheels to a non-racing drive wheel of the wheels, said control means comprising:

vehicle speed determining means for determining a vehicle speed from wheel speeds of follower wheels, drive wheel speed determining means for selecting a smaller one of the wheel speeds of said drive wheels as a drive wheel speed, when an inner-side wheel is racing during a turn, and for selecting a larger one of the wheel speeds of the drive wheels, when an outer-side wheel is racing during a turn, and torque determining means for determining said LSD torque from the vehicle speed and the drive wheel speed.

2. A drive wheel torque control system for a vehicle according to claim 1, wherein said drive wheel speed determining means selects the smaller one of the wheel speeds of said drive wheels as the drive wheel speed when the vehicle speed is low, and selects a larger one of the wheel speeds of said drive wheels as the drive wheel speed when the vehicle speed is high.

3. A drive wheel torque control system for a vehicle according to claim 2, wherein said drive wheel speed determining means selects a smaller one of the wheel speeds of said left and right drive wheels when the vehicle speed is in a mean speed range and said inner wheel is racing during a turn, and selects a larger one of the wheel speeds of said drive wheels when the vehicle speed is in the mean speed range and said outer wheel is racing during a turn.

4. A drive wheel torque control system for a vehicle according to claim 1, wherein said torque determining means includes wheel speed ratio proportional control means for finding a direction of turning movement of said vehicle from a difference between the follower wheel speeds, for judging, on the basis of said turning direction, which of said inner and outer drive wheels is racing, for comparing a ratio of the wheel speeds of said drive wheels with a ratio of the wheel speeds of follower wheels in each of a case where said inner driving wheel is racing and a case where the outer driving wheel is racing, and for determining the LSD torque to be distributed from said racing drive wheel to said non-racing drive wheel in accordance with an amount of the ratio of the wheel speeds of said drive wheels exceeding the ratio of the wheel speeds of said follower wheels.

5. A drive wheel torque control system for a vehicle according to claim 1, wherein said torque determining means includes engine torque proportional control means for providing an LSD torque corresponding to the estimated engine torque.

6. A drive wheel torque control system for a vehicle according to claim 1, wherein said torque determining means includes vehicle speed proportional control means for providing LSD torque corresponding to the vehicle speed.

7. A drive wheel torque control system for a vehicle according to claim 1, wherein said vehicle speed determining means selects a larger one of the wheel speeds of said follower wheels as the vehicle speed.

8. A drive wheel torque control system for a vehicle according to claim 6, wherein said vehicle speed proportional control means increases the LSD torque, when the vehicle speed exceeds a first predetermined value, and decreases the LSD torque, when the vehicle speed exceeds a second predetermined value larger than said first predetermined value.

9. A drive wheel torque control system for a vehicle according to claim 4, wherein said wheel speed ratio proportional control means decreases the LSD torque in response to an increase in a slip ratio of said drive wheels.

10. A drive wheel torque control system for a vehicle according to claim 4, wherein the LSD torque determined by the wheel speed ratio proportional control means is decreased in response to an increase in the vehicle speed.

11. A drive wheel torque control system for a vehicle according to claim 5, wherein said torque proportional control means decreases the LSD torque in response to an increase in the engine torque.

12. A drive wheel torque control system for a vehicle according to claim 3, wherein the vehicle speed determining means selects a larger one of the wheel speeds of the follower speeds as the vehicle speed.

13. A drive wheel torque control system for a vehicle according to claim 1, wherein said torque determining means includes:
means for calculating a first LSD torque component based on an amount of a ratio of the wheel speeds of the drive wheels exceeding a ratio of the wheel speeds of the follower wheels;
means for calculating a second LSD torque component based on an estimated engine torque; and
means for calculating a third LSD torque component based on the vehicle speed;
the torque determining means providing said LSD torque from addition of said first, second and their LSD torque components.

14. A drive wheel torque control system for vehicle according to claim 13, wherein said first LSD torque component is determined by further taking account of a racing preventing coefficient and a hydroplaning suppressing coefficient.

* * * * *